(12) United States Patent
Lin (10) Patent No.: US 8,629,378 B2
(45) Date of Patent: Jan. 14, 2014

(54) HEATING CONTROL DEVICE AND METHOD THEREOF (76) Inventor: Kevin Lin, Kowloon (HK)

( * ) Notice: Subject to any disclaimer, the term of this patent is extended or adjusted under 35 U.S.C. 154(b) by 83 days.

(21) Appl. No.: 13/062,856

(22) PCT Filed: Sep. 9, 2008

(86) PCT No.: PCT/CN2008/072306
§ 371 (c)(1),
(2), (4) Date: Mar. 8, 2011

(87) PCT Pub. No.: WO2010/028519
PCT Pub. Date: Mar. 18, 2010

(65) Prior Publication Data
US 2011/0163083 A1 Jul. 7, 2011

(51) Int. Cl.
H05B 1/02 (2006.01)
H05B 6/66 (2006.01)

(52) U.S. Cl.
USPC ...... 219/494; 219/492; 219/497; 340/870.17; 374/107

(58) Field of Classification Search
CPC ............... H05B 1/02; H05B 3/10; H05B 6/68
USPC ............. 219/494, 497, 501, 492, 413, 446.1, 219/448.11, 448.13, 710, 712
See application file for complete search history.

(56) References Cited

U.S. PATENT DOCUMENTS 3,952,182 A * 4/1976 Flanders ........................ 392/466
5,545,881 A 8/1996 Chai et al.
5,805,767 A * 9/1998 Jouas et al. .................... 392/373
6,976,052 B2 * 12/2005 Tompkins et al. ............. 709/201
2005/0133495 A1 6/2005 Kariya
2007/0108187 A1 * 5/2007 Ding et al. ..................... 219/492
2008/0292261 A1 11/2008 Kowalczyk et al.

FOREIGN PATENT DOCUMENTS

| CN | 1124909 A | 6/1996 |
| CN | 1288137 A | 3/2001 |
| CN | 2746697 Y | 12/2005 |
| CN | 1734166 A | 2/2006 |
| CN | 101118054 A | 2/2008 |
| TW | 319389 U | 9/2007 |

* cited by examiner

Primary Examiner — Mark Paschall
(74) Attorney, Agent, or Firm — Sughrue Mion, PLLC (57) ABSTRACT A heating control device for a heating apparatus comprises a power control unit connected between an external power source and a heating unit of the heating apparatus to transfer power therebetween; a first temperature sensor provided near the heating unit for detecting the temperature thereof; a second temperature sensor provided at a portion of the heating apparatus for containing an object to be heated and for detecting the temperature of the object; a storage unit for storing temperature reference values; a micro controller unit electrically connected to the first and second temperature sensors, the power control unit and the storage unit, which is used to receive temperature signals from the sensors, compare the detected temperatures to the temperature reference values, and command the power control unit to supply the heating unit with different powers. A heating control method therefore is also disclosed.

13 Claims, 6 Drawing Sheets

HEATING CONTROL DEVICE AND METHOD THEREOF

CROSS-REFERENCE TO RELATED APPLICATIONS

The application claims the priority benefits of PCT Application No. PCT/CN2008/072306 filed on Sep. 9, 2008, the contents of which are hereby incorporated by reference in its entirety.

FIELD OF THE INVENTION

The present invention relates to the field of a heating control device for controlling a heating unit in a heating apparatus as well as a heating control method.

BACKGROUND OF THE INVENTION

Traditional heating apparatuses may be, for example, electric kettles, electric cookers, electric stewpots, electric irons, roasters, electric griddles, electric fryers, electric heaters, etc. Such traditional heating apparatuses are generally provided with conventional heating elements, such as resistance wires, and are provided with temperature safety devices to protect the heating elements. Such temperature safety devices are consisted of temperature sensor-switches and temperature fuses. However, those temperature safety devices are passive safety devices, and the temperature of the heating elements could only be transferred to the temperature sensor-switches after the temperature rises for a period of time due to malfunction of the heating elements or incorrect operation of users, and then the temperature fuses could take actions accordingly. In this case, the high temperature may have already incurred certain damages to the heating elements of heating apparatuses.

Currently, several kinds of high efficient heating elements are available on the market, for example, semiconductor electric heating resistance films. If a heating apparatus is provided with such kind of semiconductor electric heating resistance films but still provided with the above-mentioned passive temperature safety devices, the malfunction of the heating elements or incorrect operation of users would incur even worse damages to the heating apparatus. Since the high efficient heating elements have a higher heating efficiency than conventional heating elements, the temperature of such high efficient heating elements could rise rapidly due to the malfunction of the heating elements or incorrect operation of users. In this case, it is not possible for the temperature sensor-switches to transfer the temperature of the heating elements to the temperature fuses in time. Thereby, before the temperature fuses could take any actions, the heating elements or even the whole heating apparatus may have already be destroyed. Thus, the temperature fuses could not act as temperature safety elements at all.

In addition, when traditional heating apparatuses with conventional heating elements heat objects to be heated, the temperature of heating elements and the temperature of the objects would not be detected at the same time and the relative relationship between those temperatures would not be considered. The heating apparatuses would continue heating the objects until the temperature of the objects reaches a pre-determined temperature. Sometimes, if the objects could not absorb all the energy generated from the heating apparatuses, the excess energy would be radiated and wasted. The problem would be even worse when heating apparatuses are provided with high efficient heating elements, since more energy would be generated from the high efficient heating element in a unit period of time, and more energy would not be absorbed by the objects to be heated.

SUMMARY OF THE INVENTION

To overcome the above-mentioned defects, the main object of the present invention is to provide a heating control device for a heating unit of a heating apparatus, which could provide safety protection to the heating apparatus and reduce energy consumption of the heating apparatus, and may comprise: a power control unit connected between an external power source and a heating unit of the heating apparatus to transfer power supplied from the external power source to the heating unit; a first temperature sensor provided near the heating unit for detecting the temperature of the heating unit; a second temperature sensor provided at a portion of the heating apparatus for containing an object to be heated, which is used to detect the temperature of the object; a storage unit for storing temperature reference values; a micro controller unit electrically connected to the first temperature sensor, the second temperature sensor, the power control unit and the storage unit, which is used to receive temperature signals detected by the first and second temperature sensors, compare the detected temperatures to the temperature reference values, and then command the power control unit to supply the heating unit with different powers according to the comparison results.

Preferably, the heating unit is a semiconductor electric heating resistance film a periphery of which is provided with conductive electrodes, and a printed circuit board is provided around the conductive electrodes, in which the conductive electrodes are fixed to the printed circuit board and the semiconductor electric heating resistance film is connected to the power control unit by means of power cables mounted on the printed circuit board via the conductive electrodes and the printed circuit board.

The present invention further provides a heating control method for controlling a heating unit of a heating apparatus comprising: supplying the heating unit with a pre-determined output power for a first pre-determined period of time, and then suspending power supply for a second pre-determined period of time; detecting the temperature of the heating unit in the second pre-determined period of time and determining a ramp-down rate of the heating unit; and comparing the ramp-down rate to a pre-determined reference value of ramp-down rate; when the ramp-down rate is smaller than the reference value of ramp-down rate, power supply to the heating unit is stopped; and when the ramp-down rate is larger than the reference value of ramp-down rate, power supply to the heating unit is resumed for a third pre-determined period of time.

In an example, the first and second pre-determined period of time is 12 seconds respectively, while the third pre-determined period of time is 2-3 minutes.

The heating control method of the present invention may further comprise: detecting the temperature of the heating unit in the first pre-determined period of time and determining a ramp-up rate of the heating unit; and determining quantity of a object to be heated contained in the heating apparatus according to the ramp-up and ramp-down rates.

In addition, the heating control method of the present invention may further comprise: associating the temperature of the object with a pre-set map of ideal temperature rise curve map in respect to the quantity; starting to detect the temperature of the object from the end of the third pre-determined period of time; comparing the temperature of the object to a temperature value of corresponding time in the map of the ideal temperature rise curve; when the temperature of the object is higher than the temperature value in the map of ideal temperature rise curve, the power to be supplied to the heating unit is lowered according to a pre-set variance, and when the temperature of the object is lower than the temperature value in the map of ideal temperature rise curve, the power to be supplied to the heating unit is raised according to the pre-set variance. The power supply to the heating unit is stopped when the temperature of the object reaches a pre-determined temperature.

BRIEF DESCRIPTION OF THE DRAWINGS

The present invention will be described in detail with reference to the accompanying drawings, in which.

DETAILED DESCRIPTION OF THE INVENTION

Figure 1:
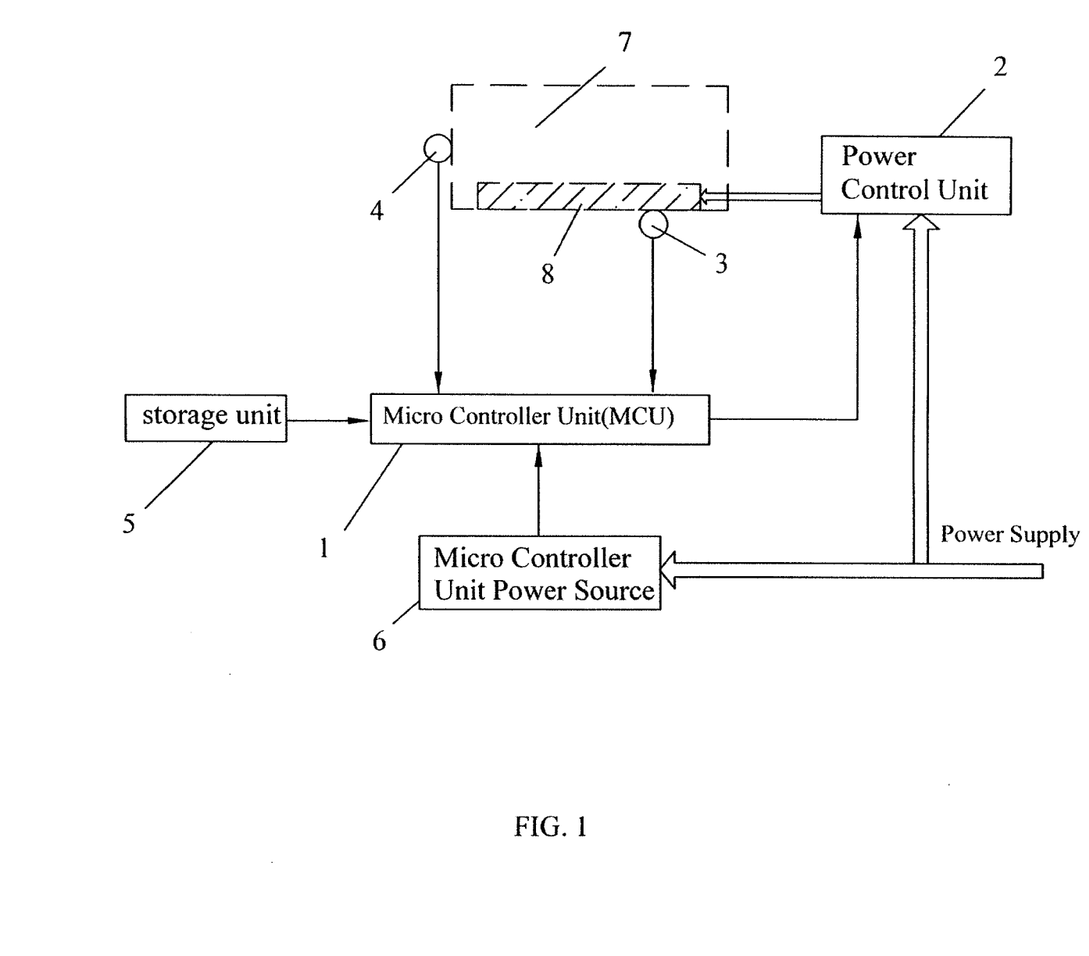
FIG. 1 is a block diagram of a heating control device according to the present invention.

FIG. 1 illustrates the heating control device of the present invention, which is mounted within a heating apparatus 7 for controlling the operation of a heating unit 8 of the heating apparatus. The heating control device mainly comprises a micro controller unit (MCU) 1, a power control unit 2 connected between an external power source and the heating unit 8 of the heating apparatus 7 for transferring power supplied from the external power source to the heating unit, a first temperature sensor 3 which is mounted near the heating unit 8 and is electrically connected to the MCU 1, for detecting the temperature of the heating unit 8 and then transmitting corresponding signals to the MCU 1, a second temperature sensor 4 which is mounted near object to be heated and is electrically connected to the MCU 1, for detecting the temperature of the object to be heated and transmitting corresponding signals to the MCU 1, a storage unit 5 for storing a variety of reference data needed for performing control. The MCU 1 is electrically connected to the power control unit 2, to enable to control power supplied from the power control unit 2 to the heating unit 8 according to comparison results between temperature signals from the first and/or second temperature sensors and the reference data stored in the storage unit 5. The heating apparatus 1 could be, for example, an electric kettle, an electric cooker, an electric stewpot, an electric iron, a roaster, an electric griddle, an electric fryer, an electric heater, etc., while the heating unit 8 could be a resistance wire, a semiconductor electric heating resistance film or other suitable heating elements.

The heating control device may be further provided with a micro controller unit power source 6, for receiving power from the external power source and supplying power to the MCU 1. The external power source may supply power to the micro controller unit power source 6 and the power control unit 2 synchronically. Therefore, when MCU 1 starts working upon the micro controller unit power source 6 supplying power thereto, it could at the same time determine that the power control unit 2 is supplied with power from the external power source and the heating unit 8 is supplied with power under control of the power control unit 2.

An electric kettle using a semiconductor electric heating resistance film as heating unit would be used as a sample to describe the operation of the present heating control device. For example, the specification of the electric kettle is 220V/1000 W, and 1 kilogram (1000 milliliter) of water needs to be boiled.

Figure 2:
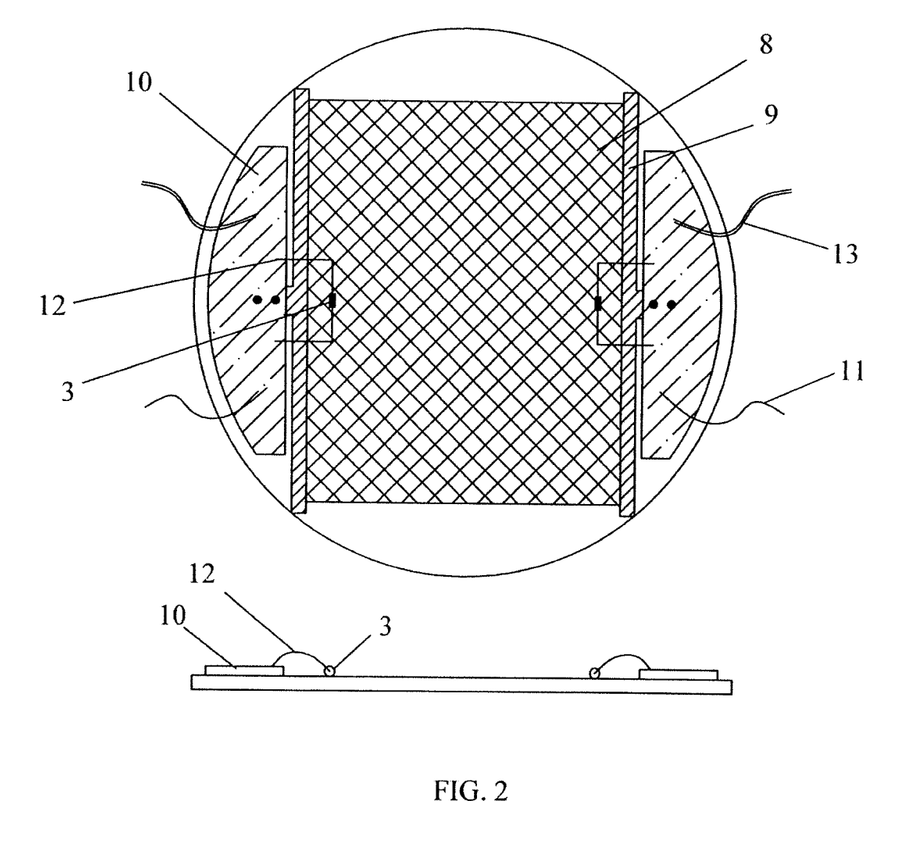
FIG. 2 is a schematic view illustrating how to mount a temperature sensor of the present heating control device on a heating unit of a heating apparatus.

Generally, film heating units such as semiconductor electric heating resistance films need substrates made of electrical insulating materials such as ceramics or glass. However, as the working temperature of such substrates may be very high, it is very difficult for wiring and mounting of elements, such as temperature sensors, wires, etc. thereon. FIG. 2 is a schematic view illustrating how to mount a temperature sensor on a heating unit, for example a semiconductor electric heating resistance film. As shown in FIG. 2, the heating unit 8 is directly mounted at an insulating region of the heating apparatus. Or, the heating unit 8 is mounted on an insulating substrate, and then the insulating substrate is mounted on the heating apparatus. Conductive electrodes 9 are mounted around the heating unit 8, and a printed circuit board (PCB) 10 is provided outside each of the conductive electrodes 9. Similarly, the PCB 10 is mounted at an insulating region of the heating apparatus or the insulating substrate, by means of for example adhering by virtue of high temperature-resistant adhesive, such as glass cement or silicone. The conductive electrodes 9 are electrically connected to the PCB 10 directly by means of for example, welding. Then, wiring is performed on the PCB 10, to enable to connect the conductive electrodes 9 to the power control unit 2 of the heating control device by virtue of power cables 11. Force-bearing points between the PCB 10 and the substrate or insulating region are located at jointing sections therebetween, such as at the high temperature-resistant adhesive, rather than at the jointing points between the conductive electrodes and the PCB. It could prevent the power cables from detaching from the conductive electrodes, which always occurs in the prior art since power cables are directly welded to conductive electrodes.

The first temperature sensor 3 is fixed to the heating unit 8, and is connected to the PCB 10 by means of leads 12. Then, the first temperature sensor 3 is connected to the MCU 1 of the heating control device by virtue of signal lines 13 on the PCB 10. Thus, it could prevent the leads from detaching from the signal lines, which always occurs in the prior art since the leads and signal lines are directly mounted on the heating unit 8.

Before the electric kettle is normally used, a dry-boiling test should be performed on the electric kettle, to test whether or not the electric kettle contains water.

Figure 3:
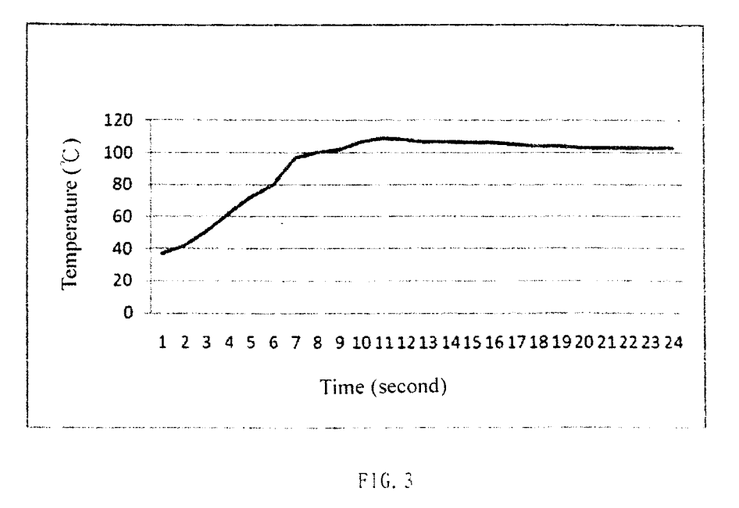
FIG. 3 is a graph illustrating temperature fluctuation of a heating unit in an electric kettle during dry-boiling test on the electric kettle not containing water.
Figure 4:
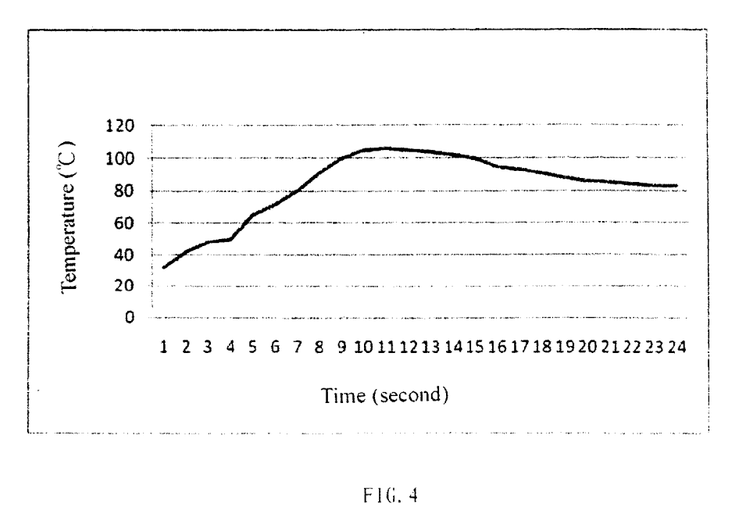
FIG. 4 is a graph illustrating temperature fluctuation of the heating unit in the electric kettle during dry-boiling test on the electric kettle containing water.

Firstly, the MCU 1 controls the power control unit 2 to supply power to the heating unit 8 for a predetermined period of time, for example, 12 seconds, with a maximum output power (hereinafter called "full power") of the external power source. Then, the MCU 1 commands the power control unit 2 to suspend supplying power to the heating unit 8 for the same predetermined period of time. However, power supply could also be suspended for a longer or shorter period of time. At the same time, the first temperature sensor 3 starts to detect the temperature of the heating unit 8, and transmit corresponding temperature signals to the MCU 1. If the electric kettle does not contain water, the temperature of the heating unit 8 would drop slowly during suspension of power supply by the power control unit 2. That is, the ramp-down rate of the heating unit is small, as shown in FIG. 3. However, if the electric kettle is containing water, the temperature of the heating unit 8 would drop much more rapidly during suspension of power supply. That is, the ramp-down rate of the heating unit would be relatively larger, as shown in FIG. 4. A reference value of ramp-down rate could be pre-set and stored in the storage unit 5, which could be set according to the type of the heating apparatus and the heating unit thereof. For example, in the present sample, the reference value of ramp-down rate could set as 0.75° C./s. The MCU 1 would calculate the ramp-down rate of the heating unit 8 according to the temperature of the heating unit detected by the first temperature sensor 3 during suspension of power supply, and compare the ramp-down rate to the reference value. If the ramp-down rate is smaller than the reference value, the MCU 1 could determine that the electric kettle does not contain water, and then command the power control unit 2 to stop supplying power to the heating unit 8. In addition, the MCU 1 may be electrically connected to an alarm (not shown in the figures), such as a warning light and/or a speaker, to enable to command the alarm to emit alarming signals when the MCU 1 determines that the electric kettle does not contain water.

However, if the MCU 1 determines that the ramp-down rate of the heating unit is larger than the reference value, it could determine that the electric kettle contains water, and then command the power control unit 2 to resume power supply to the heating unit 8.

By means of the above dry-boiling test, the present invention could determine whether the electric kettle is in a status of dry-boiling, i.e. whether the electric kettle contains water, in such a manner that the heating unit of the electric kettle only needs to be heated to about 100-120° C. However, traditional temperature safety devices could not take relevant protective actions until the heating unit is heated to 250-300° C. Thus, the present heating control device could protect the heating apparatuses from damage more perfectly.

Figure 5:
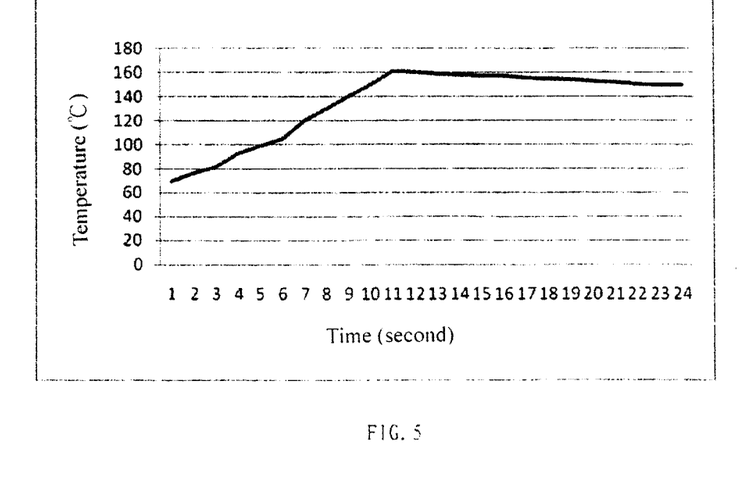
FIG. 5 is a graph illustrating temperature fluctuation of the heating unit in the electric kettle during dry-boiling test on the electric kettle not containing water after the electric kettle is used normally for a first time.

Furthermore, when the electric kettle is used to boil water again immediately after a previous operation, a dry-boiling test should be applied to the electric kettle once again in the above-mentioned matter. Similarly, if the electric kettle does not contain water, the ramp-down rate of the temperature of the heating unit 8 is relatively small during suspension of power supply by the power control unit 2, as shown in FIG. 5. However, if the electric kettle contains water, the ramp-down rate of the heating unit 8 would be relatively large during suspension of power supply, as shown in FIG. 6.

Figure 6:
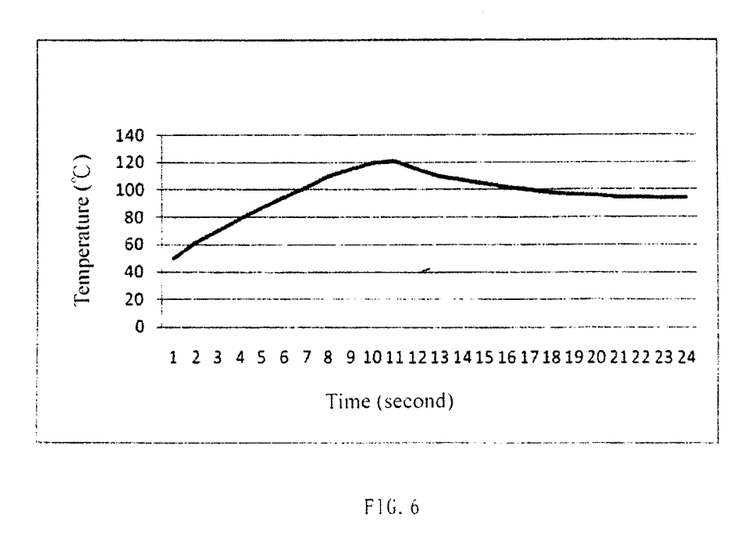
FIG. 6 is a graph illustrating temperature fluctuation of the heating unit in the electric kettle during dry-boiling test on the electric kettle containing water after the electric kettle is used normally for a first time.

Thus, even though the temperature of the heating unit of the electric kettle is still relatively high immediately after the electric kettle has just finished boiling water, the present heating control device still could determine whether the electric kettle is in a status of dry-boiling, i.e. whether the electric kettle contains water, in such a manner that the heating unit of the electric kettle only needs to be heated to about 160-170° C., as shown in FIGS. 5 and 6.

During the stage of power supply in the above dry-boiling test, the first temperature sensor would also detect the temperature of the heating unit continuously, and transmit corresponding temperature signals to the MCU. The MCU would calculate the ramp-up rate of the temperature of the heating unit according to the received temperature signals. Then, the MCU would compare the ramp-up rate and ramp-down rate of the heating unit to a temperature-quantity map stored in the storage unit, to determine the quantity of water contained in the electric kettle. The temperature-quantity map is generated empirically according to the type of the electric kettle and the heating unit thereof, which could establish a mapping relation between the ramp-up and ramp-down rates of the heating unit and the quantity of the object to be heated.

Figure 7:
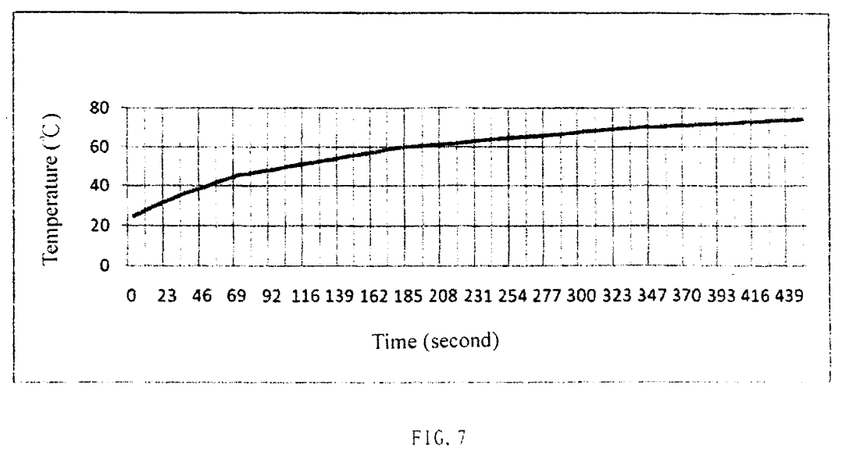
FIG. 7 is an ideal temperature rise curve of water contained in the electric kettle.

According to the empirical data of the operation of the heating unit and balance between power consumption and boiling period, a plurality of ideal temperature rise curves could be formed for respective quantities of the object to be heated recorded in the temperature-quantity map. For example, FIG. 7 illustrates the ideal temperature rise curve for 1 kilogram of water. Thus, upon determining the quantity of the object to be heated according to the ramp-up and ramp-down rates of the heating unit, the MCU could also determines the optimum heating manner to be applied to the object to be heated. Maps of ideal temperature rise curves could also be stored in the storage unit, to enable the MCU to compare temperatures of the object to be heated detected by the second temperature sensor 4 to corresponding temperatures recorded in the maps of ideal temperature rise curves, and command the power control unit 2 to supply the heating unit 8 with different powers according to the comparison results, which is a step of power modulation.

After the MCU determines that the electric kettle contains water by means of the dry-boiling test and determines the quantity of water according to the ramp-up and ramp-down rates of the heating unit of the electric kettle during the step of dry-boiling test, it would choose a corresponding map of ideal temperature rise curve from the storage unit, and enter into the step of power modulation.

Figure 8:
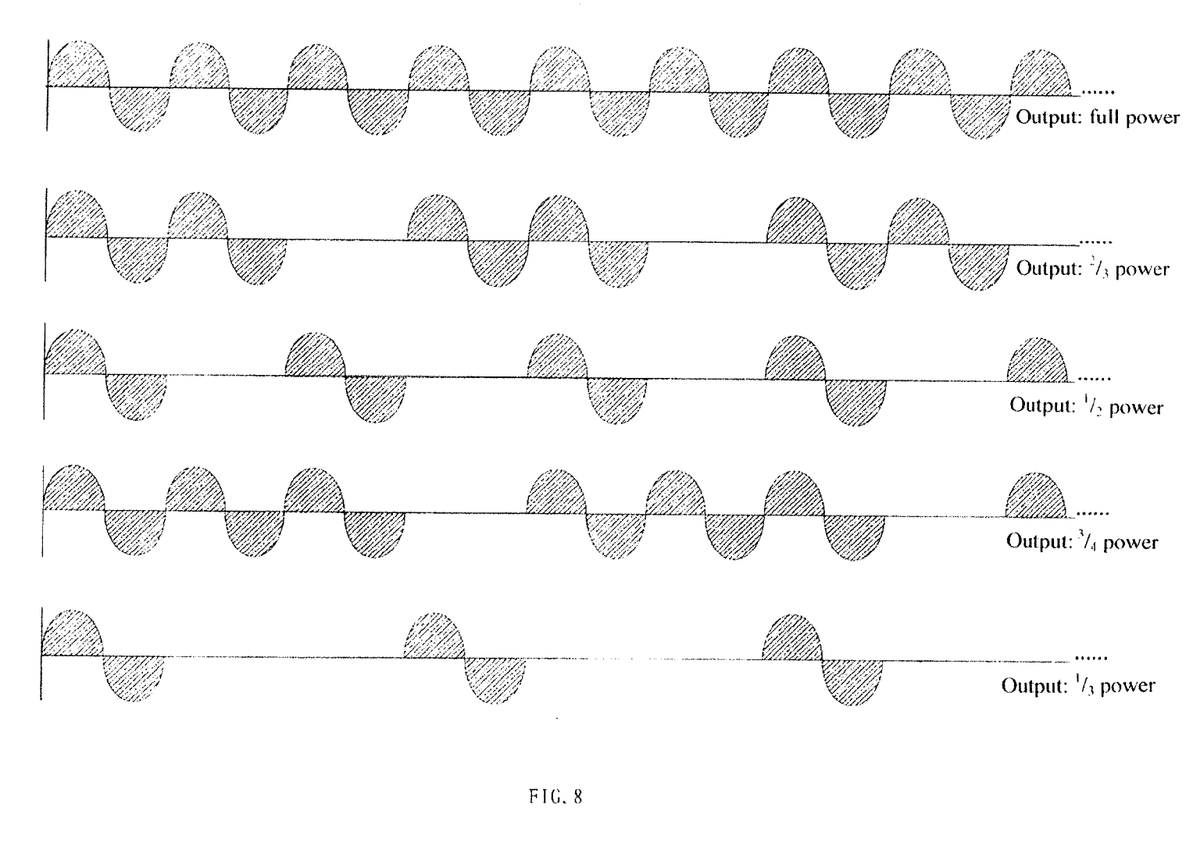
FIG. 8 is a schematic view of power waveform output from a power control unit to the heating unit.

Firstly, the MCU commands the power control unit to supply the heating unit with full power for a certain period of time, such as 2-3 minutes. Then, the second temperature sensor 4 starts to detect the temperature of the object to be heated, and transmit corresponding temperature signals to the MCU, and at the same time the MCU starts timing. The MCU compares the temperatures of the heating unit detected by the second temperature sensor 4 at different times to the temperature values of corresponding times in the map of ideal temperature rise curve. When a detected temperature is higher than the corresponding temperature value in the map, the MCU commands the power control unit 2 to lower the power supplied to the heating unit 8, such as, from full power to two-thirds of full power (hereinafter called "⅔ power"), as shown in FIG. 8. At the same time, the second temperature sensor 4 continues detecting the temperature of the object to be heated, and the MCU continues comparing the detected temperatures to the corresponding temperature values in the map. If the detected temperature is still higher than the temperature value in the map, the MCU would command the power control unit to further lower power supplied to the heating unit 8, such as from ⅔ power to half of full power. The variance of power output from the power control unit could be set according to actual demand. For example, the output power could be raised or lowered according to the gradient of third-fourths of full power (¾ power), two-thirds of full power (⅔ power), half of full power (½ power), one-third of full power (⅓ power), one-fourth of full power (¼ power), one-fifth of full power (⅕ power), one-sixth of full power (⅙ power) and one-seventh of full power (⅐ power), until the output power is raised to full power or lower to ⅐ power. Therefore, if the detected temperature is still higher than the corresponding temperature value in the map, the MCU would command the power control unit to lower the output power according to the pre-set gradient, until the output power is lowered to ⅓ power.

To the contrary, when the MCU determines that the temperature of the object to be heated detected by the second temperature sensor is lower than the corresponding temperature value of the corresponding time in the map of ideal temperature rise curve, the MCU would command the power control unit to raise power to be supplied to the heating unit according to the pre-set variance, until the power is raised to full power.

In addition, the MCU could also alter the variance of power to be supplied according to the difference between the detected temperature and the corresponding temperature value in the map of ideal temperature rise curve. For example, the power to be supplied could be lowered directly from full power to ⅔ power. In this connection, a reference value of temperature difference could be pre-set and stored in the storage unit. When the MCU determines that the difference between the detected temperature and the temperature value in the map is smaller than the reference value of temperature difference, it would command the power control unit to lower or raise power to be supplied according to pre-set variance or gradient step by step. However, when the MCU determines that the difference between the detected temperature and the temperature value in the map is larger than the reference value of temperature difference, it would command the power control unit to lower or raise power to be supplied according to two or more times of pre-set variance or gradient.

When the MCU 1 determines that the temperature of the object to be heated reaches boiling temperature, it would command the power control unit 2 to stop supplying power to the heating unit 8, and finish the whole heating operation. Then, the heating control device could store the during of the heating operation as well as the data and analysis methods used in this heating operation in the storage unit. Such data could be used directly for temperature control for similar situations in the future.

With the heating control device and temperature control method of the present invention, the heating apparatus could save about 40-60% of energy, and the period needed for boiling water is only about 20-30 second longer than that for the normal electric kettle without provided with the present invention. Thus, a secure and power-efficient heating operation could be realized.

Although the description of the present invention is made with reference to the preferred embodiments, the present invention is not limited to these embodiments. Various modifications and changes can be made to the invention by those skilled in the art without departing from the spirit and scopes of the present invention.

What is claimed is:

1. A heating control device for a heating apparatus comprising:
   a power control unit connected between an external power source and a heating unit of the heating apparatus to transfer power supplied from the external power source to the heating unit;
   a first temperature sensor provided near the heating unit for continuously detecting the temperature of the heating unit for a predetermined amount of time during which includes a duration that power is supplied to the heating unit and a duration that power is suspended from the heating unit;
   a second temperature sensor provided at a portion of the heating apparatus for containing an object to be heated, for continuously detecting the temperature of the object for the predetermined amount of time;
   a storage unit configured to store predetermined rate of change temperature reference values based on a type of heating unit and heating apparatus being controlled by the heating control device;
   a micro controller unit electrically connected to the first temperature sensor, the second temperature sensor, the power control unit and the storage unit, configured to continuously receive temperature signals detected by the first and second temperature sensors during the predetermined amount of time, determine a rate of change of the detected temperatures of each of the first and second temperature sensors during the predetermined amount of time, compare the rate of change to the temperature reference values during the predetermined amount of time, and then command the power control unit to supply the heating unit with different powers according to the comparison results.

2. The heating control device according to claim 1, wherein the heating unit is a semiconductor electric heating resistance film a periphery of which is provided with conductive electrodes, and a printed circuit board is provided around the conductive electrodes, in which the conductive electrodes are fixed to the printed circuit board and the semiconductor electric heating resistance film is connected to the power control unit by means of power cables mounted on the printed circuit board via the conductive electrodes and the printed circuit board.

3. The heating control device according to claim 2, wherein the first temperature sensor is provided on a surface of the semiconductor electric heating resistance film and connected to the printed circuit board, to enable to be connected to the micro controller unit via the printed circuit board.

4. The heating control device according to claim 1, wherein the rate of change temperature reference values include a reference value of ramp-down rate, the predetermined amount of time comprises a first predetermined period of time and a second predetermined period of time, the micro controller unit commands the power control unit to supply the heating unit with a maximum output power of the external power source for the first predetermined period of time and then suspend power supply for the second predetermined period of time, and determines a ramp-down rate of the heating unit according to the temperature of the heating unit detected by the first temperature sensor in the second predetermined period of time, in which when the micro controller unit determines that the ramp-down rate is smaller than the reference value of ramp-down rate, it commands the power control unit to stop supplying power to the heating unit; and when the micro controller unit determines that the ramp-down rate is larger than the reference value of ramp-down rate, it commands the power control unit to supply the heating unit with the maximum output power for a third predetermined period of time.

5. The heating control device according to claim 4, wherein the first and second pre-determined period of time is 12 seconds respectively, while the third pre-determined period of time is 2-3 minutes.

6. The heating control device according to claim 4, wherein the temperature reference values include a temperature-quantity map, the micro controller unit determines a ramp-up rate of the heating unit according to the temperature of the heating unit detected by the first temperature sensor in the first pre-determined period of time, and determines quantity of the object in accordance with the temperature-quantity map according to the ramp-up and ramp-down rates.

7. The heating control device according to claim 6, wherein the temperature reference values includes maps of ideal temperature rise curves in association with respective quantities recorded in the temperature-quantity map, the micro controller unit compares the temperature of the object detected by the second temperature sensor from the end of the third pre-determined period of time to a temperature value of corresponding time in a corresponding map of ideal temperature rise curve, in which when the temperature of the object is lower than the temperature value in the corresponding map of ideal temperature rise curve, the micro controller unit commands the power control unit to raise power to be output according to a pre-set variance; and when the temperature of the object is higher than the temperature value in the corresponding map of ideal temperature rise curve, the micro controller unit commands the power control unit lower power to be output according to the pre-set variance.

8. The heating control device according to claim 7, wherein the micro controller unit commands the power control unit to stop supplying power to the heating unit when the temperature of the object reaches a pre-determined temperature.

9. A heating control method for controlling a heating unit of a heating apparatus comprising:
   storing a pre-determined reference value of ramp-down rate in a storage unit;
   supplying the heating unit with a pre-determined output power for a first pre-determined period of time, and then suspending power supply for a second pre-determined period of time;
   continuously detecting the temperature of the heating unit in the second pre-determined period of time and determining a ramp-down rate of the heating unit during the second pre-determined period of time; and
   comparing the ramp-down rate to the pre-determined reference value of ramp-down rate;
   wherein when the ramp-down rate is smaller than the reference value of ramp-down rate, power supply to the heating unit in response to the continuous temperature detection is not resumed; and when the ramp-down rate is larger than the reference value of ramp-down rate, power supply to the heating unit is resumed for a third pre-determined period of time.

10. The heating control method according claim 9, wherein the first and second pre-determined period of time is 12 seconds respectively, while the third pre-determined period of is 2-3 minutes.

11. The heating control method according to claim 9 further comprising:
   detecting the temperature of the heating unit in the first pre-determined period of time and determining a ramp-up rate of the heating unit;
   determining quantity of a object to be heated contained in the heating apparatus according to the ramp-up and ramp-down rates.

12. The heating control method according to claim 11 further comprising:
   associating the temperature of the object with a pre-set map of ideal temperature rise curve map in respect to the quantity;
   starting to detect the temperature of the object from the end of the third pre-determined period of time;
   comparing the temperature of the object to a temperature value of corresponding time in the map of the ideal temperature rise curve;
   wherein when the temperature of the object is higher than the temperature value in the map of ideal temperature rise curve, the power to be supplied to the heating unit is lowered according to a pre-set variance, and when the temperature of the object is lower than the temperature value in the map of ideal temperature rise curve, the power to be supplied to the heating unit is raised according to the pre-set variance.

13. The heating control method according to claim 11, wherein the power supply to the heating unit is stopped when the temperature of the object reaches a pre-determined temperature.

* * * * *